(12) United States Patent
Eslambolchi

(10) Patent No.: US 6,300,902 B1
(45) Date of Patent: Oct. 9, 2001

(54) PERSONALIZED LOCATOR METHOD AND APPARATUS

(75) Inventor: Hossein Eslambolchi, Basking Ridge, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/247,684

(22) Filed: Feb. 10, 1999

(51) Int. Cl.$^7$ .................................................. G01S 3/02
(52) U.S. Cl. ............................... 342/450; 342/419
(58) Field of Search ................................. 342/417, 457, 342/44, 51, 450, 419

(56) References Cited

U.S. PATENT DOCUMENTS

| | | | |
|---|---|---|---|
| D. 321,329 | 11/1991 | Barnett et al. | D10/104 |
| D. 358,107 | 5/1995 | Bossen | D10/104 |
| D. 381,922 | 8/1997 | Casperson | D10/104 |
| D. 390,487 | 2/1998 | Thun | D10/106 |
| D. 391,510 | 3/1998 | Leo et al. | D10/104 |
| 5,021,794 | 6/1991 | Lawrence | 342/457 |
| 5,252,962 * | 10/1993 | Urbas et al. | 340/825.54 |
| 5,347,263 * | 9/1994 | Carroll et al. | 342/44 |
| 5,485,163 * | 1/1996 | Singer et al. | 342/457 |
| 6,049,718 * | 4/2000 | Stewart | 455/456 |
| 6,088,429 * | 7/2000 | Garcia | 379/88.22 |

FOREIGN PATENT DOCUMENTS

| | | |
|---|---|---|
| 0 708 952 B1 | 3/1997 | (EP) . |
| 63163295 A | 7/1988 | (JP) . |
| 04125800 A | 4/1992 | (JP) . |
| 07239981 A | 9/1995 | (JP) . |
| 10003572 A | 1/1998 | (JP) . |
| 10124781 A | 5/1998 | (JP) . |

OTHER PUBLICATIONS

Adshel Tests Lost Child Tag Scheme, Marketing Week; Oct. 2, 1997, p. 9.

* cited by examiner

Primary Examiner—Daniel T. Pihulic
(74) Attorney, Agent, or Firm—Robert B. Levy

(57) ABSTRACT

A concerned individual (12) seeking to locate a missing person (14) does so by dialing a special number associated with a locating service offered through a Public Switched Telecommunications Network (16). After dialing the special number, the concerned individual (12) enters a sequence of digits that correspond to a numeric identifier, such as social security number or telephone number, or the missing person (14). Upon receipt of the digit sequence, the PSTN (16) whether the missing person is a subscriber of the locating service, and if so, the PSTN causes one or more cell sites (28–28) of a wireless service communications system to broadcast a first coded frequency signal for receipt by a passive transponder (32) carried by the missing person. The passive transponder decodes the first coded frequency signal to yield electrical power to energize a transmitter (38) within the transponder to transit a second coded frequency signal for tracking by direction-sensitive receivers (33) to locate the missing person.

7 Claims, 2 Drawing Sheets

PERSONALIZED LOCATOR METHOD AND APPARATUS

TECHNICAL FIELD

This invention relates to a technique for locating an individual via a radio beacon.

BACKGROUND ART

Each year, children wander away from their parents and often become lost, some times for a considerable period. Not infrequently, a child will stray from its home or separate from a parent at a store or park, causing great anguish and concern. Occasionally, criminals abduct children for nefarious purposes, prompting fear of possible harm. Adults who suffer from loss of memory, especially those who suffer from Alzheimer's disease, also become lost from relatives or caregivers giving rise to worries that such individuals may suffer harm.

Once a child or adult becomes lost, public safety personnel incur the task of locating that person. Often, such public safety personnel, sometimes aided by volunteers, spend countless hours searching for the missing child or adult. In some instances, delays in locating a missing individual can prove tragic once the missing individual's surroundings becomes unsafe, either as a result of a criminal act of another, or as a result of a dangerous natural environment. Thus, prompt location of the missing individual is critical.

Various schemes exist for locating individuals once they become lost or missing. U.S. Pat. No. 5,021,794, issued Jun. 4, 1991, in the name of Robert Lawrence, discloses a personal emergency locator system that includes an UHF transceiver carried by an individual whose location is of interest. Should the individual wearing the transceiver become lost, then a parent, caregiver, or other concerned person uses the public switched telephone network to communicate with a signal repeater. Once in communication with the signal repeater, the parent, caregiver, or concerned seeking to locate the missing child or adult actuates a signal generator that produces a coded signal carried by the PSTN to the repeater for broadcast. Upon receipt of the signal broadcast by the repeater, the receiver portion of the UHF transceiver carried by the missing individual triggers the transmitter portion of the transceiver to broadcast a homing signal for tracking by public safety personnel using direction-finding receivers in their vehicles.

The Lawrence '794 patent incurs several drawbacks. First, the UHF transceiver carried by the missing person is an "active" device that requires a DC power source, in the form of a battery, for operation. Once the battery becomes depleted, the transceiver loses its ability to broadcast a homing signal. Second, with the Lawrence locating system, the individual seeking to locate the missing child or adult must possess a signal generator to generate the coded signal broadcast for receipt by the transceiver carried by the missing child or adult. Absent such a signal generator, the individual seeking to locate the missing person cannot actuate the transceiver on the missing person to transmit the homing signal.

Thus, there is a need for a technique for locating a missing child or adult that overcomes the aforementioned disadvantages of the prior art.

BRIEF SUMMARY OF THE INVENTION

Briefly, the present invention provides a method for locating a lost child or adult. In accordance with the method, upon a determination that a child or adult is lost or missing, a parent, caregiver, or other concerned individual will dial an access number to obtain access to a special service offered through the public switched telecommunications network for locating lost or missing persons. After dialing the telephone number associated with the service, the individual seeking to locate the lost child or adult then enters a predetermined sequence of digits corresponding to a prescribed frequency code of a passive transponder carried by the missing person. The individual accessing the locating service may enter the predetermined digit sequence (typically corresponding to the social security number or other such numeric identifier of the missing person) by entering the digits on the telephone keypad, or alternatively, by speaking the digits for subsequent conversion to DTMF signals. Upon receipt of the predetermined digit sequence, the PSTN signals one or more transmitters, typically those associated with wireless communication service, to transmits a signal containing the prescribed frequency code of the transponder carried by the missing child or adult. The transponder converts the prescribed frequency code into electrical power to energize a transmitter within the transponder that transmits a homing signal having a prescribed frequency code that identifies the missing child or adult, thus allowing public safety personnel to track that missing person.

DETAILED DESCRIPTION

Figure 1:
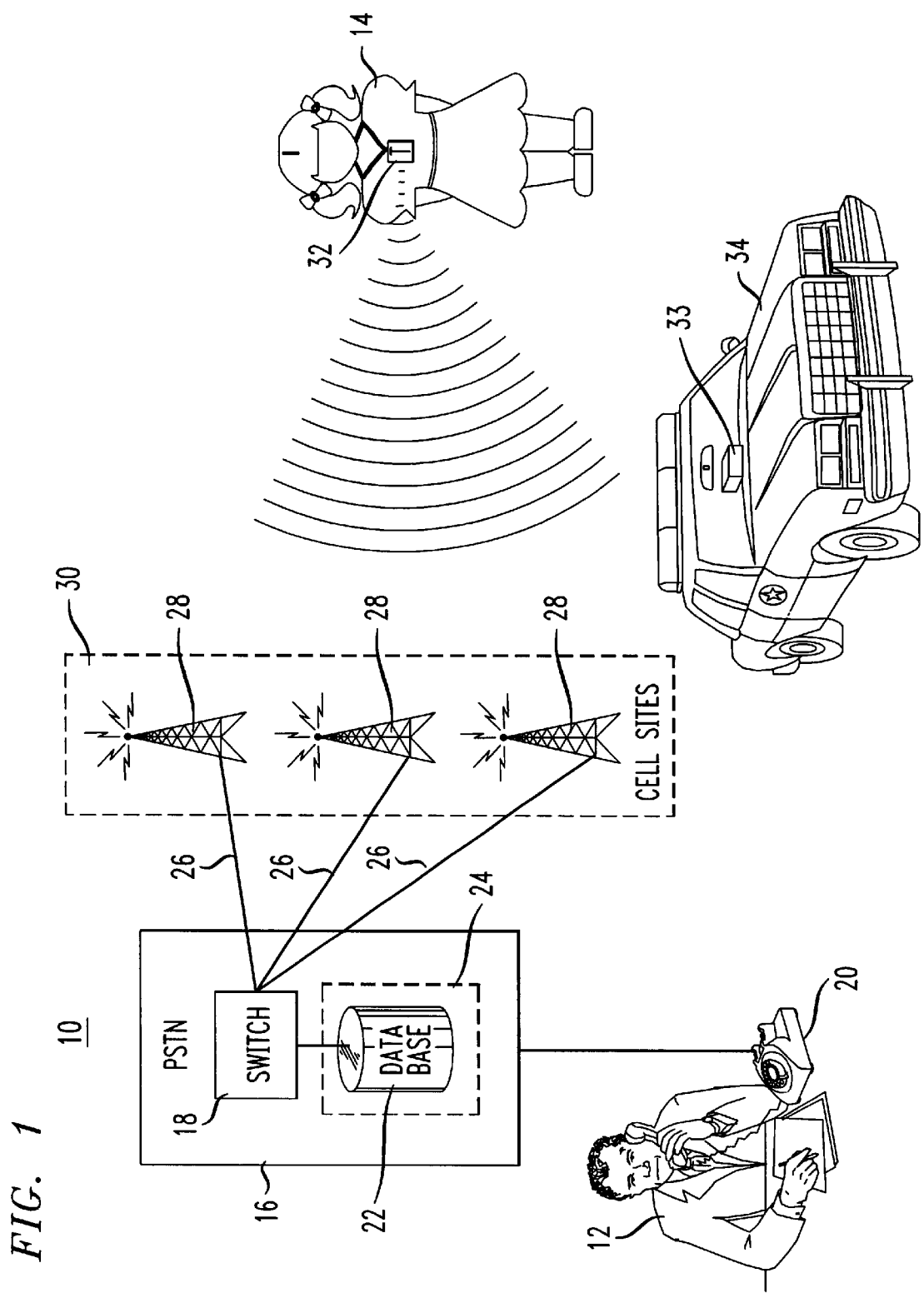
FIG. 1 illustrates a block schematic diagram of an apparatus in accordance with the invention, for locating a missing child or adult.

FIG. 1 illustrates an apparatus 10 in accordance with the invention for enabling a concerned individual 12, such as a parent, caregiver, or relative, to locate a missing child or adult 14 who may have wandered away. The apparatus 10 includes a central communications facility 16, which, in the preferred embodiment, takes the form of a Public Switched, Telephone Network (PSTN) such as the PTSN maintained by AT&T Corp. The PSTN 16 includes at least one telecommunications switching system 18 as are known in the art, for receiving a telephone call, originated by the concerned individual 12 through a telephone set 20 to access the locating service of the invention.

In the illustrated embodiment, the telephone set 20 enjoys a direct connection to the PSTN 16. However, in some instances a local exchange carrier (not shown) may connect the telephone set 20 to the PSTN 16.

In addition to the switching system 18, the PSTN 16 also includes at least one more database 22 accessible by the switching system. In the illustrated embodiment, the database 22 may comprise a Network Control Point within a signaling network 24, such as AT&T's SS7 network that provides signaling information to the switch 18. In the present invention, the database 22 contains information that enables the PSTN 16 to offer a service that locates individuals, such as individual 14. In particular, the database 22 contains the social security numbers, or other numeric identifiers, such as telephone numbers, of the individuals to be located.

A set of communication channels 24—24 couple the PSTN to separate cell cites 28—28 comprising part of a wireless communications network 30, such as the network maintained by AT&T Wireless Services, Inc. Normally, the cell cites 28—28 function to handing conventional wireless telephone traffic by transmitting and receiving signals from wireless communications devices (not shown). However, in accordance with the invention, the cell cites 28—28 will jointly broadcast a coded frequency signal unique to the missing individual 14 in response to a communication from the switch 18 of the PSTN 16 when an individual, such as individual 12, invokes the locating service of the invention to individual 14 when he/she becomes lost or missing.

The coded frequency signal broadcast by the cell cites 28—28 corresponds to the coded frequency assigned to a transponder 32 carried by the person 14 being located. As discussed below, the transponder 32 responds only to a particular coded frequency assigned to the person 14 carrying the transponder. Upon receipt of its unique coded frequency signal from the cell cites 28—28, the transponder 32 responds by transmitting a coded frequency signal unique to the lost person 14 for tracking by one or more direction-sensitive receivers 33, typically carried in the vehicles 34 maintained by public safety agencies.

Figure 2:
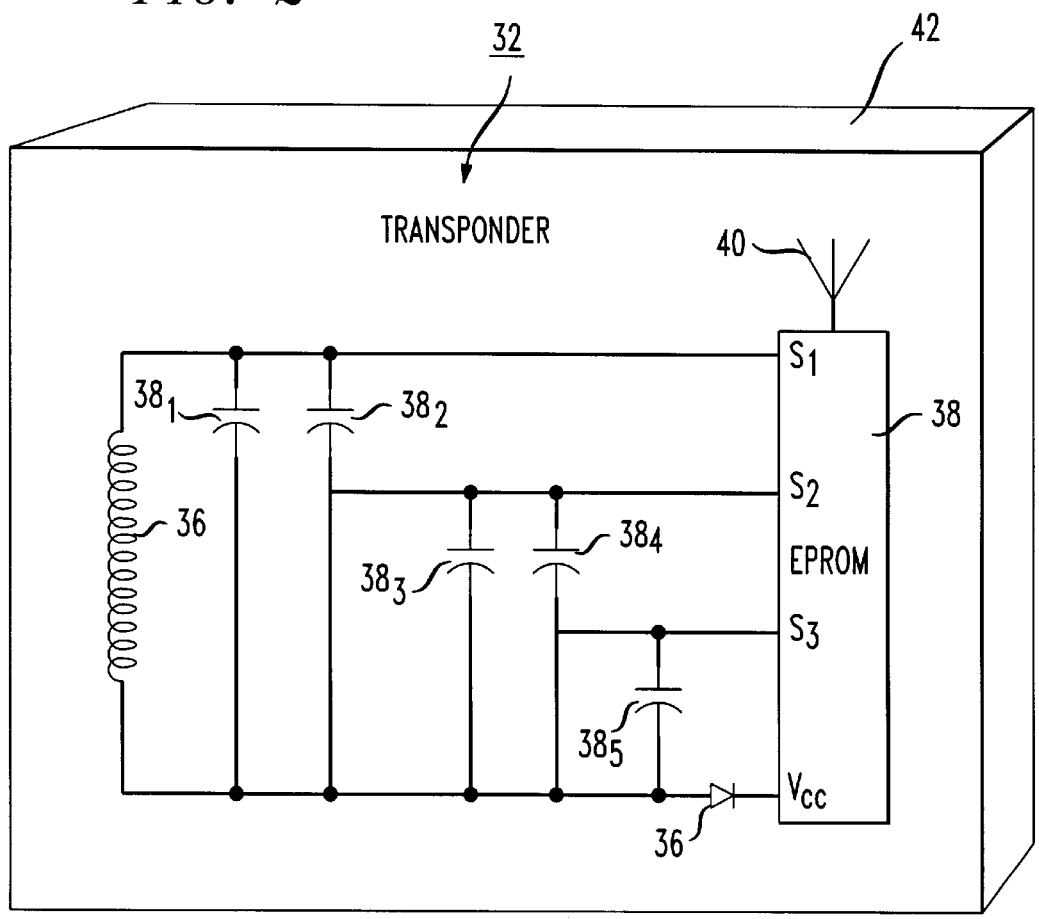
FIG. 2 is a block schematic diagram of a transponder comprises a portion of the apparatus of FIG. 1.

FIG. 2 shows a schematic diagram of transponder 32. The transponder 32 includes a tuned circuit 34 constructed of an inductor 36 and a bank of capacitors $38_1$, $38_2$, $38_3$, $38_4$, and $38_5$ connected such that capacitor $38_1$ shunts the coil 36, while capacitors $38_2$ and $38_3$ serially shunt the capacitor $38_1$, and capacitors $38_4$ and $38_5$ shunting the capacitors $38_3$. Each of the capacitors $38_1$–$38_5$ has a first terminal coupled to the anode of a rectifier diode 36 whose anode is coupled to the $V_{cc}$ input of an Electrically Programmable Read Only Memory (EPROM). The EPROM 38 has its signal inputs $S_1$, $S_2$, $S_3$ coupled to the second terminal of capacitor 38 , capacitor $38_3$ and $38_5$, respectively. The tuned circuit 34 serves to decode the predetermined frequency signal associated with the transponder, and in combination with the diode 36, produce a DC signal to power the EPROM 38. When energized by this DC signal, the EPROM 38 produces a unique coded frequency signal for transmission by antenna 40. Typically, although not necessarily, the coded frequency signal corresponds to the social security number or another specific numeric identifier, associated with the missing person 14. To avoid interference, the EPROM 38 generates its coded output signal at a different frequency than the signals generated by the cell sites 28—28 of FIG. 1. The components of the transponder, namely the tuned circuit 34, diode 36, EPROM 38 and antenna 40 arc all housed in a hermetically sealed enclosure 42 which is sized sufficiently small to allow attachment to a person's clothing.

To locate missing person 14, the concerned individual 12 dials a special telephone number (e.g., 1-8xxx-LOST KID) associated with the locating service of the invention using telephone 20 of FIG. 1. The special telephone number is typically, although not necessarily, a toll-free number. Upon receipt of the telephone call to the telephone number associated with the locating service, the switching system 18 within the PSTN 16 will prompt the caller (concerned individual 12) to enter the numeric identifier (e.g., social security number) of the missing person 14. The switching system 18 then accesses the database 22 to ascertain whether a record exists for the missing person 14. In other words, the database 22 checks whether the missing person 14 subscribes to the service. If so, then the switching system 18 communicates with each of the cell sites 26—26 via communications channels 26—26 to command each site to broadcast the corresponding coded frequency signal assigned to the transponder 32 carried by the missing person 14.

The transponder 32 receives and decodes the coded frequency signal transmitted by the cell sites 28—28 to produce a DC signal to excite the EPROM 38 of FIG. 2 within the transponder. In turn, the EPROM 38 transmits its coded frequency signal for homing by the direction-sensitive receiver 33 of FIG. 1 in each public safety vehicle 34, allowing location of the missing person 14.

The locating technique of the invention described above affords the advantage that the concerned individual 12 can initiate location of the missing person 14 from any telephone without the need for any special device. Moreover, by employing a passive transponder 32 powered by the locating signals transmitted from the cell sites 28—28, the need for a battery within the transponder is obviated.

The above-described embodiments merely illustrate the principles of the invention. Those skilled in the art may make various modifications and changes that will embody the principles of the invention and fall within the spirit and scope thereof.

What is claimed is:

1. A method for locating an individual comprising the steps of:

receiving in a Public Switched Telecommunications Network (PSTN) a sequence of digits identifying a passive transponder carried by the individual to be located;

transmitting, in response to receipt of the sequence of digits received in the PSTN, a first prescribed coded frequency signal that is unique to the passive transponder of the individual to be located such that only upon its receipt will the transponder decode the first prescribed coded frequency signal to produce electrical power to energize a transmitter associated with said transponder to transmit a second coded frequency signal that uniquely identifies the individual to be located; and tracking, via direction-sensitive receivers, said second coded frequency signal to locate the individual.

2. The method according to claim 1 wherein the sequence of digits is received in the PSTN as DTMF signals entered through a telephone keypad.

3. The method according to claim 1 wherein the sequence of digits is received as speech for subsequent conversion to DTMF signals.

4. The method according to claim 1 wherein the sequence of digits received by the PSTN corresponds to a social security number assigned to the individual to be located.

5. The method according to claim 1 wherein the sequence of digits received by the PSTN corresponds to a telephone number assigned to the individual to be located.

6. The method according to claim 1 wherein the second coded frequency signal corresponds to a numeric identifier associated with the person to be located.

7. The method according to claim 6 wherein the numeric identifier is a social security number assigned to the person to be located.

* * * * *